United States Patent [19]

Pillai

[11] Patent Number: 4,896,497
[45] Date of Patent: Jan. 30, 1990

[54] PFBC POWER PLANT
[75] Inventor: Krishna K. Pillai, Finspong, Sweden
[73] Assignee: Abb Stal AB, Sweden
[21] Appl. No.: 256,434
[22] Filed: Oct. 12, 1988
[30] Foreign Application Priority Data Oct. 20, 1987 [SE] Sweden .................................. 8704075

[51] Int. Cl.$^4$ .............................................. F02C 3/28
[52] U.S. Cl. .................................. 60/39.12; 60/39.464;
110/229; 110/263
[58] Field of Search ........................... 60/39.12, 39.464;
110/229, 263; 122/4 D; 431/170

[56]  References Cited
U.S. PATENT DOCUMENTS

| 3,446,012 | 11/1967 | Foster-Pegg . | |
|---|---|---|---|
| 3,763,830 | 10/1973 | Robison et al. | 122/4 D |
| 4,183,208 | 12/1977 | Horgan et al. | |
| 4,253,409 | 3/1981 | Wormser | 110/263 |
| 4,417,528 | 11/1983 | Vining et al. | 110/229 |
| 4,779,574 | 10/1988 | Nilsson et al. | 122/4 D |
| 4,796,568 | 1/1989 | Pilla | 122/4 D |
| 4,802,445 | 2/1989 | Robertson | 60/39.12 |

FOREIGN PATENT DOCUMENTS

EPA044172  9/1984  European Pat. Off. .
A149400  5/1975  United Kingdom .

Primary Examiner—Louis J. Casaregola
Attorney, Agent, or Firm—Pollock, Vande Sande & Priddy

[57]  ABSTRACT

The invention relates to a PFBC power plant comprising a bed vessel (12) which is divided into a first section (14) and a second section (16) by a vertical partition (17) which reaches up to the upper wall of the bed vessel (12) so that freeboards (86 and 46, respectively), which are separated from each other, are formed. The first section (14) of the bed vessel (12) forms a gas generator in which a burnable gas is generated. This burnable gas is cleaned in a gas cleaner (90) and is burnt in a secondary combustion chamber (98) and is mixed with the combustion gases from the second section (16) of the bed vessel (12) and raises the temperature of the gas supplied to a gas turbine to an optimum level for the gas turbine.

10 Claims, 1 Drawing Sheet

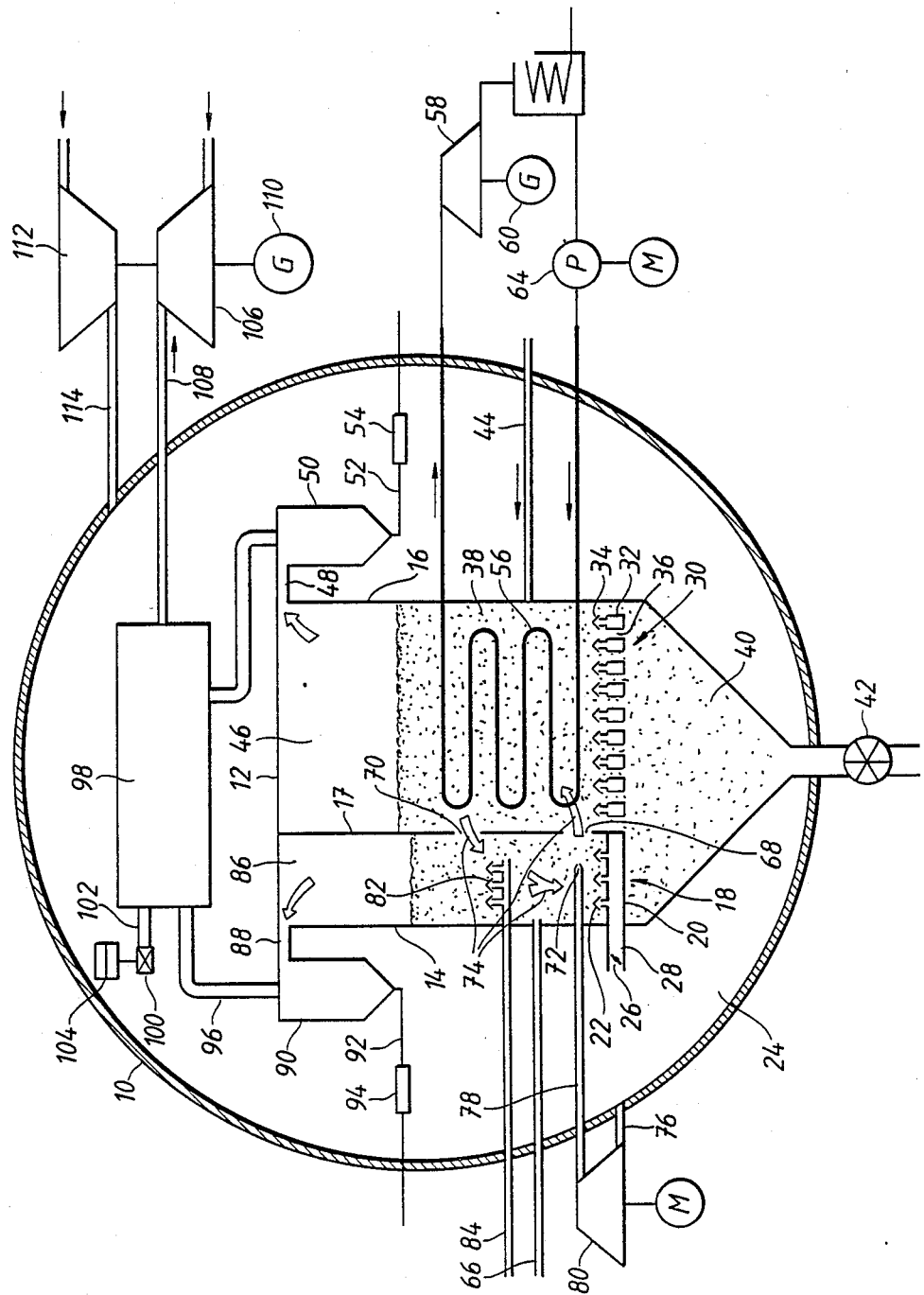

PFBC POWER PLANT

TECHNICAL FIELD

The present invention relates to a power plant burning a fuel in a fluidized bed of particulate material which may consist of a sulphur absorbent. The bed is located in a bed vessel and the combustion is performed at a pressure exceeding the atmospheric pressure. The pressure may amount to 15-20 MPa. The combustion gases are utilized to drive one or more gas turbines which drive compressors and/or generators which deliver electric current to a power network, Usually, the bed vessel and a cleaning plant for separating solid particles from the combustion gases are placed in a common pressure vessel. The steam generated in cooling tubes in the bed is utilized in a steam turbine.

Power plants of this kind are internationally usually called PFBC power plants, the letters "PFBC" being the initial letters of the English expression "Pressurized Fluidized Bed Combustion.

BACKGROUND ART AND THE TECHNICAL PROBLEM

During combustion in a fluidized bed, the combustion temperature must be maintained below the level at which slag formation arises and slag lumps are formed, which disturb the fluidization and render impossible the discharge of residual products. The upper temperature limit during combustion of coal in a fluidized bed varies with the coal quality and is usually between about 850° and 950° C. This means that the propellent gas for the turbines included in a PFBC power plant has a temperature which is approximately equal to the temperature in the fluidized bed. As the turbine power increases steeply with increasing temperature of the propellent gas, a considerably higher propellent gas temperature, up to about 1200° C., is desirable in order to achieve a high power output in the gas turbine section of the plant.

From EP No. 0 144 172 it is known to attain a temperature of 1350° C. in gases leaving a combustion chamber burning coal in a fluidized bed. The combustion chamber is intended to generate gases for a process industry. The bed vessel is divided into two sections. One section is driven as a gas generator, the gas of which being burnt in a freeboard common to both sections. Dust in the gas seems to have no importance since no cleaning plant is shown.

THE INVENTION

The object of the invention is to to increase, in a PFBC power plant, the efficiency and the power output in the gas turbine section by increasing the temperature of the gas supplied to the gas turbines.

According to the invention, a burnable gas is generated in a gas generator and burnt in a secondary combustion chamber. Combustion gas from the secondary combustion chamber having a high temperature is mixed with combustion gases from the bed vessel having a lower temperature. The higher temperature obtained in the propellent gas of the turbine gives a higher turbine efficiency.

In the power plant the bed vessel is divided into a first and a second section by means of a vertical partition extending up to the upper wall of the bed vessel so that two separate freeboards are obtained in the two sections. In the lower part of the wall, i.e. in the bed region, there are openings allowing the bed material to circulate between the two sections. Coal is supplied to the two bed vessel sections through separate fuel feed systems and the feeding is controlled by separate control systems. In the first bed vessel section, forming a gas generator, burnable gas is generated. This gas is cleaned in a cleaning plant and is supplied to a secondary combustion chamber where it is burnt. Combustion gases from the second bed vessel section are cleaned and mixed with the combustion gases from the secondary combustion chamber, suitably in the secondary combustion chamber, and are supplied to a gas turbine included in the plant. The bed vessel, the gas cleaner and the secondary combustion chamber may be enclosed within a common pressure vessel, but there is nothing preventing the secondary combustion chamber from being placed outside of the pressure vessel, for example adjacent to the gas turbine. When the secondary combustion chamber is placed in the pressure vessel, the advantage is gained that the pressure difference between the inner and outer sides of the combustion chamber is small, which reduces the stresses and the design problems. The invention makes it possible to raise the temperature of the propellent gases from the gas turbine and hence the power in the gas turbine section of the plant. The allowed inlet temperature may amount to about 1200° C. An increase of the propellent gas temperature to this level may involve a power increase in the gas turbine section by about 10%.

The bed vessel has a bottom with nozzles for the supply of air for generation of the burnable gas and partial combustion of the fuel in the first section and for fluidization of the bed material and combustion of the fuel in the second section. Below the bottom of the bed vessel there is an ash chamber for collecting residual products from burnt coal and consumed bed material. At the lower part of the ash chamber, discharge devices for the material in the ash chamber are provided. The bottom in the second bed vessel section may consist of elongated air distribution chambers between which gaps are formed. Through these gaps, bed material and residual products may fall down into the ash chamber. The bottom in the first bed vessel section is suitably constructed in such a way that material is unable to pass through the bottom of the ash chamber.

Circulation of bed material between the first and second bed vessel sections can be brought about by means of air or other gas which is injected into the first bed vessel section through at least one nozzle which is directed towards an opening in the partition, suitably towards a lower opening in the wall. Bed material with possibly unburnt fuel is transported through this opening from the first bed vessel section to the second bed vessel section. Material from the second bed vessel section will flow from the second bed vessel section.

Coal is fed at a suitable level into the first bed vessel section. Upon contact with the hot bed material, volatile components are gasified. The supplied air provides partial combustion of coal, whereby carbon monoxide, CO, is formed. In the first bed vessel section, nozzles may be provided above the bottom for the supply of additional air or steam. By the supply of steam, water gas is obtained. In addition to different volatile hydrocarbons and CO, the burnable gases may then also contain hydrogen, $H_2$.

BRIEF DESCRIPTION OF THE DRAWING

The invention will be described in greater detail with reference to the accompanying drawing, the single figure of which shows the invention applied to a PFBC power plant.

In the figure, 10 designates a pressure vessel. In it is arranged a bed vessel 12, which is divided by a partition 17 into a first section 14 and a second section 16. A bottom 18 in the first section 14 of the bed vessel 12 is designed as a wind box 20 with nozzles 22. From the space 24 between the pressure vessel 10 and the bed vessel 12, this wind box 20 is supplied with combustion air via a flow controlling device symbolized by the valve 26 in the supply conduit 28. A bottom 30 in the second section 16 of the bed vessel 12 is designed with a number of elongated parallel wind boxes 32 with nozzles 34. The air flow from the space 24 is controlled by control means (not shown). Between these wind boxes 32 there are formed gaps 36 through which particulate bed material in a fluidized bed 38 may pass from the second section 16 of the bed vessel 12 to the ash chamber 40 below the bottoms 18 and 30. Material in the chamber 40 is fed out, for example, through a rotary vane feeder 42.

Fuel from a fuel storage (not shown) is fed through a conduit 44 into the second bed vessel section 16. Through the nozzles 34 air is supplied in such a quantity that the bed material 38 is fluidized and complete combustion of supplied fuel is obtained. The combustion gases are collected in the freeboard 46 and are led through the pipe 48 to the cyclone 50, which symbolizes a cleaning plant which may consist of a number of groups of series-connected cyclones. Separated dust consisting of ashes and consumed bed material is removed through the conduit 52 and a pressure-reducing discharge device 54, which may be of the type described in European patent application No. 0 108 505. This device 54 also cools the dust. The bed is cooled by tubes 56. Steam generated in these tubes 56 drives a steam turbine 58 and a generator 60 connected thereto. The steam which leaves the turbine 58 is condensed in the condenser 62. The condensate is returned by the feed water pump 64 to the tubes 56. From a fuel storage (not shown) coal is fed into the first bed vessel section 14 through a conduit 66. The partition 17 is provided with at least one lower opening 68 and at least one upper opening 70 which enables circulation between the two sections 14 and 16 of the bed vessel which are separated by the partition 17. The circulation can be influenced and controlled by the injection of air or other gas through a nozzle 72 opposite to the lower opening 68. Bed material will then circulate between the bed vessel sections 14 and 16, as shown by the arrows 74. The nozzle 72 can be supplied with air direct from the space 24 or, as shown in the figure, via the conduits 76 and 78 and the booster compressor 80. Since only a quantity of air, which is insufficient for complete combustion of the supplied coal, is supplied to the first bed vessel section 14 through the nozzles 22, burnable gases are formed in this section 14, consisting of volatile components in the coal and carbon monoxide, CO, formed during the incomplete combustion. The air quantity supplied through the nozzles is, as mentioned, insufficient for a complete combustion and may be less than the quantity required for fluidization of the bed material in the first bed vessel section 14. In the first bed vessel section 14, nozzles 82 may be provided, which are positioned above the nozzles 22 at the bottom 18 of the first bed vessel section 14. These nozzles 82 are supplied with air or steam via the conduit 84. By steam injection, water gas is formed and the burnable gases formed in the bed vessel section 14 will also contain hydrogen gas, $H_2$. The gases collected in the freeboard 86 are passed through the conduit 88 to the cyclone 90, which symbolizes a gas cleaning plant. Dust or ashes separated in the cyclone 90 is removed through the conduit 92 with a pressure reducing ash discharge device 94. The separated dust may contain a considerable quantity of unconsumed fuel. For this reason, it may be convenient to return the separated dust to the second bed vessel section 16, where the unburnt material is burnt.

From the gas cleaner (cyclone) 90 the burnable gas is led through a conduit 96 to a secondary combustion chamber 98, which in the shown embodiment is located inside the pressure vessel 10. By this location, the pressure difference between the interior of the combustion chamber 98 and the environment is small, which entails a low load on the wall and a simple construction. Air for combustion is taken from the space 24, where the pressure is higher than in the secondary combustion chamber 98. The air quantity is controlled by the valve 100 in the air conduit 102. An operating device 104 for setting the valve 100 receives an operating signal from a signal processing device (not shown), to which transducers (not shown) for measuring the excess air in the combustion gases are connected. The combustion gases from the secondary combustion chamber 98 are mixed with the cleaned combustion gases from the second bed vessel section 16 and are supplied to a gas turbine 106 through a conduit 108. As shown in the figure, the gas cleaner 50 may be connected to the downstream end of the secondary combustion chamber 98 and the gases from the second section 16 of the bed vessel 12 be mixed with combustion chamber gases in the combustion chamber 98. There is nothing preventing the combustion chamber 98 from being positioned outside the pressure vessel 10 and being directly connected to the inlet of the turbine 106. To achieve the highest turbine power, the plant is controlled such that, if possible, the propellent gases of the turbine 106 attain a temperature equal to or close to the maximum permissible gas temperature of the turbine.

The gas turbine 106 drives a generator 110 as well as a compressor 112. Through a conduit 114, the compressor 112 supplies the space 24 with compressed air for fluidization and combustion.

I claim:
1. A power plant burning fuel, primarily coal, in a fluidized bed of particulate material, at a pressure exceeding the atmospheric pressure, a so-called PFBC power plant, comprising a bed vessel (12) with a bottom (18, 30) with nozzles (22, 34) for supplying the bed vessel (12) with air for fluidization of the bed (38) of the particulate material and combustion of the fuel supplied to the bed (38), a gas turbine (106) driven by combustion gas from the bed vessel (12), and a compressor (112), suitably driven by said turbine (106), compressing fluidization air and combustion air, characterized in that the bed vessel (12) is divided into a first section (14) and a second section (16) by a vertical partition (17) reaching up to the upper wall of the bed vessel (12)

so that freeboards (86 and 46, respectively) separated from each other are formed in said first section (14) and said second section (16), said first section (14) of the bed vessel (12) forms a gas generator in which a burnable gas is generated, the lower part of the partition (17) is provided with at least one opening (68) for transferring bed material from said first section (14) of the bed vessel (12) to said second section (16), the plant comprises a secondary combustion chamber (98) for combustion of the burnable gas generated in the gas generator, and the plant comprises a device for mixing the combustion gases generated in said secondary combustion chamber (98) and in said second section (16) before the gases are supplied to the turbine (106).

2. A power plant according to claim 1, characterized in that a gas cleaner (90) is arranged between the gas generator and the secondary combustion chamber.

3. A power plant according to claim 1, characterized in that the partition (17) is provided with openings (68, 70) at different levels for circulation of bed material between the first section (14) and the second section (16) of the bed vessel (12).

4. A power plant according to claim 1, characterized in that the secondary combustion chamber (98) comprises devices for mixing of the combustion gases generated in said secondary combustion chamber and in said second bed vessel section (16).

5. A power plant according to claim 1, characterized in that the bed vessel (12) and the secondary combustion chamber (98) are located inside a common pressure vessel (10).

6. A power plant according to claim 1, characterized in that said first section (14) of the bed vessel (12) is provided with nozzles (82) fo the supply of steam to the bed.

7. A power plant according to claim 1, characterized in that said first section (14) of the bed vessel (12) is provided with nozzles (82) for the supply of air and/or steam above the bottom (18) of the bed vessel (12).

8. A power plant according to claim 1, characterized in that the bed vessel (12) comprises a device (72) which influences the circulation of bed material between said first and second sections (14, 16) of the bed vessel (12).

9. A power plant according to claim 8, characterized in that said device (72) comprises a gas nozzles (72) which is directed towards an opening (68) in the partition (17) between the first and second sections (14, 16) of the bed vessel (12).

10. A power plant according to claim 8, characterized in that the first section (14) of the bed vessel (12) has an area which is less than 25% of the total area of the bed vessel (12), preferably about 10% of the total area of the bed vessel (12).

* * * * *